United States Patent [19]
Hu

[11] Patent Number: 6,157,903
[45] Date of Patent: Dec. 5, 2000

[54] METHOD OF MINIMIZING MACROCELL CHARACTERIZATION TIME FOR STATE DEPENDENT POWER ANALYSIS

[75] Inventor: Jhyfang (Jeff) Hu, Cupertino, Calif.

[73] Assignee: Synopsys, Inc., Mountain View, Calif.

[21] Appl. No.: 09/041,828

[22] Filed: Mar. 12, 1998

[51] Int. Cl.⁷ .................................................. G06F 17/50
[52] U.S. Cl. ............................................ 703/14; 703/18
[58] Field of Search ................................. 703/14, 13, 18; 716/17, 18

[56] References Cited

U.S. PATENT DOCUMENTS

| 5,625,803 | 4/1997 | McNelly et al. | 703/14 |
| 5,673,200 | 9/1997 | Toyonaga et al. | 716/18 |
| 5,682,320 | 10/1997 | Khouja et al. | 716/4 |
| 5,754,436 | 5/1998 | Walsh et al. | 713/300 |

OTHER PUBLICATIONS

Jiing–Yuan Lin et al., *A Power Modeling and Characterization Method for Macrocells Using Structure Information*, 1997 IEEE/ACM International Conference on Computer–Aided Design, Digest of Technical Papers, pp. 502–506.

Jiing–Yuan Lin et al., *A Structure–Oriented Power Modeling Technique for Macrocells*, IEEE Transactions on Very Large Scale Integration (VLSI) Systems, vol. 7, No. 3, Sep. 1999, pp. 380–391.

Devadas et al.; "Estimation of Power Dissipation in CMOS Combinational Circuits"; 1990; Custom Integrated Circuits Conference.

A. Bogliolo et al.; "Accurate Logic–Level Power Estimation"; 1995; DEIS, Universita di Bologna, Bologna, Italy; CIS, Stanford University, Stanford CA, USA.

Peter H. Schneier et al.; "Fast Power Estimation of Large Circuits"; 1996; Siemens AG, Technical University of Munich, Germany.

*Primary Examiner*—Eric W. Stamber
*Assistant Examiner*—Russell W. Frejd
*Attorney, Agent, or Firm*—Wagner, Murabito & Hao LLP

[57] ABSTRACT

A system and method are described for providing state dependent power consumption characterization data for a logic cell and for minimizing characterization time in a computer controlled power estimation process. The present invention identifies power-equivalent states of the logic cell, and selects one of the power-equivalent states to be characterized. Characterization data produced is then shared among other power-equivalent states. In one embodiment of the present invention, power-equivalent states of a cell are identified by a transition pattern of the inputs and output of the logic cell. Particularly, transitions which result in similar input and output transition patterns are considered power-equivalent states. Because only a single simulation run is carried out for a plurality of power-equivalent states, simulation time is saved significantly. In another embodiment, power-equivalent states of a cell are identified according to transition patterns of circuit nodes defined by a transistor-level netlist of the logic cell. In that embodiment, transition states that produce similar nodal transitions are considered power-equivalent states. Further, transition states may be stored in association with nodal transition patterns in a hash table to avoid sorting and, thus, grouping time is also minimized.

28 Claims, 8 Drawing Sheets

NTP (000R) = H ZZ f

FIG. 6B

NSDP(000R)=H_0.0R0.0F0.0r1.0f0.0h 750 H0.01

METHOD OF MINIMIZING MACROCELL CHARACTERIZATION TIME FOR STATE DEPENDENT POWER ANALYSIS

FIELD OF THE INVENTION

The present invention relates to the field of electronic design automation (EDA). More specifically, the present invention relates to the field of state dependent power characterization of logic cells used in EDA applications.

BACKGROUND OF THE INVENTION

Overview of the EDA Process

Because chip fabrication is expensive and time consuming, a chip designer often uses computer-aided design (CAD) tools to simulate a particular design before actually fabricating the chip in silicon. The CAD tools used for designing and simulating the functionality's of integrated circuits (ICs) are generally known as EDA systems. Using an EDA system, a circuit designer can simulate a particular design to make sure that it falls within certain constraints, such as die area and power consumption, before the design is actually fabricated. If the simulated results do not fall within a desirable range of values, the circuit designer may modify the design and rerun the simulations until acceptable results are achieved.

In order to simplify the IC design process, EDA systems typically include a library of cells which model various common combinational and sequential logic circuits. Some examples of these common library cells include multiplexed cells and arithmetic logic units (ALUs) cells. These cell libraries provide the components or "building blocks" that an IC designer can use to build a complex chip. In addition to storing the logic behavior of the "building blocks," the cell libraries also contain information regarding the timing delays of the cells, the amount of die area the cells will occupy, the amount of power the cells will consume, etc. Using these information, the EDA system will then be able to calculate various characteristics of an IC composed from these library cells. Naturally, in order to for an EDA system to provide precise calculations, each cell must be accurately characterized. That is, the library developers must accurately estimate the timing delays, the die area, power consumption, etc., of each cell within the library.

Conventionally, the power consumption characteristics, or power behavior, of a cell is exhaustively characterized. In the conventional exhaustive characterization method, each and every possible input transition pattern is applied to the cell, and the power consumed is measured by well known simulation software such as SPICE or PowerMill for each input transition pattern. The conventional method, while accurate, is only applicable to characterizing simple cells with relatively few inputs. For complex cells, or macrocells, this conventional method is impractical. The reason is that the number of simulations required to exhaustively characterize a cell exponentially increases as the number of cell input increases. Particularly, if there are N inputs, the number of simulation required for single input change characterization would be $2^N*N$. Thus, when the number of input is large, e.g. more than 32, a very large number of simulations would be required. Even when state of the art computer systems with multiple high-speed microprocessors are used, such characterization processes can take more than weeks. Given the short development cycle of today's IC market, such a long simulation time is unacceptable.

In addition to the long simulation time, the conventional characterization method produces raw data files that are extremely large. Not only do these raw data files require a large amount of memory and storage space, performance of power estimation tools are also significantly hindered.

Prior Art Methods of Reducing Characterization Time

Several methods have been proposed to solve the aforementioned problems with characterizing macrocells. One method, described in "Energy Characterization based on Clustering," *Proc. 33rd ACM/IEEE Design Automation Conference*, pp. 702–707, June 1996, by Mehta et al., is to run circuit simulations for a number of random input transition patterns. Based on the switching capacitance measured from the simulation runs, closely related energy patterns are grouped into clusters. The clusters are then used to characterize the macrocell. That method effectively reduces the number of simulation runs, and hence, reduces the characterization time. However, accuracy is sacrificed since input transition patterns which are not simulated remain undefined and are treated as "don't cares" during the clustering process.

Another method is described by Lin et al. in "A Power Modeling and Characterization Method for Macrocells Using Structure Information," *IEEE/ACM ICCAD 97*, pp. 502–506, November 1997. In their approach, exhaustive logic simulation is first conducted to derive an extended truth table for the macrocell. From the truth table, compatible pattern sets are grouped to construct a state transition graph. The number of state variables in the extended truth table can be further reduced by selecting a loading ratio threshold. That is, if the ratio of the capacitive loading of a node over the total capacitive loading of the whole macrocell is larger than the preset threshold, the node will be removed from the state variable list. That approach, however, is limited only to macrocells composed from basic cells where equivalent gate-level structures are available. In many cases, the required gate-level structures may not be available. Further, selecting a proper loading ratio is not a straight forward task. Usually, a high level of skill and experience on the part of the user is required.

In sum, the currently available methods of characterizing a macrocell are inadequate. What is needed is a method of characterizing a macrocell that can achieve SPICE-like accuracy, and yet is efficient and fast enough to be performed within a reasonable time frame. The solution presented herein not only enhances the accuracy of currently available characterization methods, but also organizes and stores the characterization data in a concise format that can be referenced efficiently by cell-level power analysis tools.

SUMMARY OF THE INVENTION

A system and method are described for minimizing characterization time for a logic cell in a computer controlled power estimation process. The present invention identifies power-equivalent states of the logic cell, and groups the power-equivalent states into clusters according to their respective power consumption characteristics. According to one embodiment of the present invention, one state in each cluster is characterized. Since power-equivalent states share similar power characteristics, only one set of characterization data is needed for each cluster. Accordingly, characterization time for the logic cell is minimized without compromising characterization accuracy.

Specifically, in one embodiment of the present invention, power-equivalent states of a cell are identified based upon input and output transition patterns of the cell. In this embodiment, transition states of the cell are grouped according to an output transition pattern. Then, transition states within each group are further differentiated into sub-groups according to their input transition patterns. Transition states in the same sub-group are considered power-equivalent states. One transition state from each sub-group is then selected and simulated, and the resulting simulation data is shared by all the transition states within the same sub-group. As a result, fewer simulation runs are needed to fully characterize the cell.

In another embodiment of the present invention, power-equivalent states are identified based on a nodal transition pattern of the cell. In this embodiment, a list of circuit nodes is first compiled from a transistor level netlist of a logic cell. Then, steady state input patterns are applied and propagated through a network of transistors represented by the netlist to generate nodal steady states for the circuit nodes. Nodal switching dynamics patterns are then compiled form the nodal steady states. In this embodiment, transition states that produce identical nodal switching dynamics patterns are considered power-equivalent states, which are grouped together in one cluster. In this way, only a single simulation run is necessary for one cluster, and simulation time is saved significantly.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one skilled in the art that the present invention may be practiced without these specific details. In other instances, well known methods, procedures, components, and circuits have not been described in detail as to avoid unnecessarily obscuring aspects of the present invention.

I. NOTATION AND NOMENCLATURE

Some portions of the detailed descriptions which follow are presented in terms of steps, procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

If should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "determining", "indicating", "transmitting", "repeating", or the like, refer to the actions and processes of a computer system or similar electronic computing device. The computer system or similar electronic device manipulates and transforms data, represented as physical (electronic) quantities within the computer system's registers and memories, into other data, similarly represented as physical quantities within the computer system memories, into other data similarly represented as physical quantities within the computer system memories or registers or other such information storage, transmission, or display devices.

II. COMPUTER SYSTEM ENVIRONMENT

Figure 1:
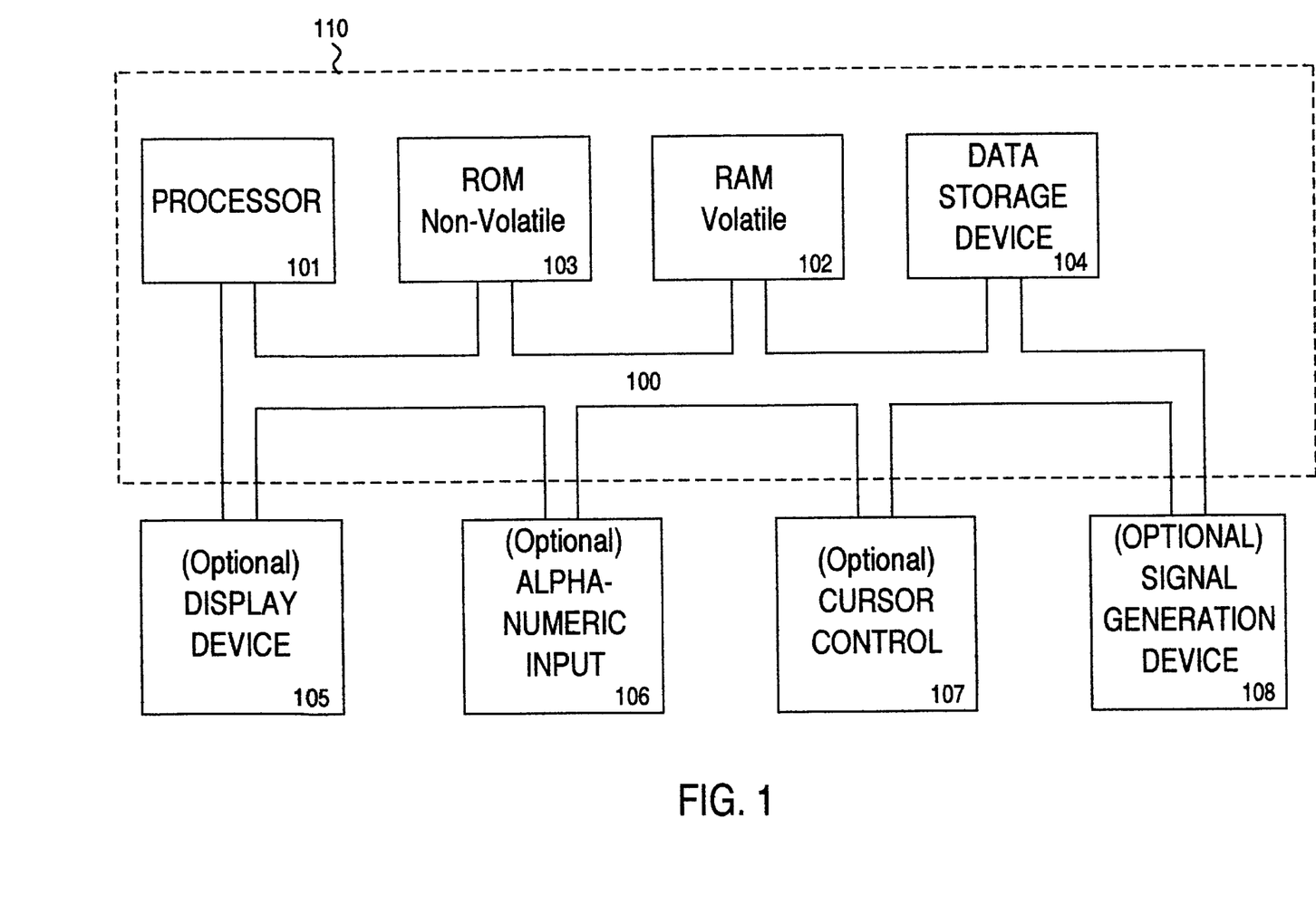
FIG. 1 is an exemplary computer system used in accordance with the present invention as an EDA system for design synthesis.

Specific aspects of the present invention are operable within a programmed computer aided design (CAD) system or electronic design automation (EDA) system. A CAD system operable to implement the elements of the present invention is shown in FIG. 1. In general, the CAD system of the present invention includes a computer system 110 which includes an address/data bus 100 for communicating information including address, data, and control signals, one or more central processors 101 coupled to bus 100 for processing information and instructions, random access memory (RAM) 102 coupled to bus 100 for storing information and instructions for processor(s) 101; read only memory (ROM, EPROM, EEPROM, etc.) 103 coupled to bus 100 for storing static information and instructions for the processor(s) 101, a data storage device 104 (e.g., a magnetic or optical disk and disk drive) coupled to bus 100 for storing information and instructions, an alphanumeric input device 106, including alphanumeric and function keys, coupled to bus 110 for communicating information and command selections to processor(s) 101, a cursor control device 107 coupled to bus 100 for communicating user input information and command selections to processor(s) 101, a display device 105 coupled to bus 100 for displaying information, and a signal generation device 108 coupled to bus 100 for communicating signals that are input and output from the system 110.

Program instructions executed by the EDA system can be stored in RAM 102, ROM 103, or in the storage device 104 and when executed in a group can be referred to as logic blocks or procedures. It is appreciated that data produced at various logic synthesis stages of the present invention, including representations of different levels of abstraction of an integrated circuit design, can also be stored in RAM 102, ROM 103 or the storage device 104 as shown in FIG. 1.

Further, within the following discussions of the present invention, certain processes, steps, structures, models, tables, and libraries are discussed that are realized, in one implementation, as a series of instructions (e.g. software program) and/or data that reside within computer readable memory units of system 110 and executed and/or read by processors of system 110. When executed, the instructions cause the computer system 110 to perform specific behavior which are described in detail to follow where appropriate. Further, the models, libraries, and data structures discussed herein are stored in computer readable memory units of system 110 and represent physical characteristics and behaviors (e.g. power consumption) of physical integrated circuits. It is also appreciated that system 110 of FIG. 1 is exemplary only and that the present invention can operate within a number of different computer systems.

III. GENERAL DESCRIPTION OF THE PRESENT INVENTION

Generally, there are two types of power dissipation in digital circuits: static and dynamic. Static power dissipation refers to the power a circuit dissipates in the absence of switching action. Static power dissipation results from the presence of a path in the circuit between the power supply and ground even when the inputs and outputs of the circuit are not changing. Dynamic power dissipation, on the other hand, occurs only when switching signals are applied to the circuit. Particularly, dynamic power dissipation is dependent on input transition patterns. In other words, power dissipated by a logic gate is dependent upon the "beginning" state and the "ending" state of the circuit. For example, for a 4-input NAND gate, power dissipation may be greater when the input pattern is changed from 1111 to 1110 than when the input pattern is changed from 1001 to 1000. Analyzing power consumption characteristics of a logic cell based on its input states and output states is generally known as state dependent power analysis.

The present invention provides a method of and a system for providing characterization data for a complex logic cell, and for minimizing characterization time in a computer controlled power estimation process. According to the present invention, transitions that exhibit similar power behavior are identified and grouped together to share a same set of characterization data. For example, the amount of power dissipated by the 4-input NAND gate when the input pattern changes 1001 to 1000 may be very similar to the amount of power dissipated when the input pattern changes from 0101 to state 0100. The difference between these two transitions may be so small that it may be safely neglected without compromising accuracy. Under this condition, it is possible to characterize only one of these two transitions and have both transitions share the same set of characterization data. Objectives of the present invention are achieved when one set of characterization data is shared among multiple transitions such that characterization for some of the transitions may be skipped.

In the following discussion, unless stated otherwise, transitions exhibiting similar power behavior are called power-equivalent states. According to one embodiment of the present invention, power-equivalent states are grouped together to form a cluster by using a static (non-simulation) process. Further, transitions exhibiting different power behavior are grouped in different clusters. Then, according to the present embodiment, one transition state in each cluster is selected and characterized. Therefore, characterization time and effort is significantly reduced since time-consuming simulation is conducted only once for each cluster.

IV. POWER-EQUIVALENT STATES

Figure 2A:
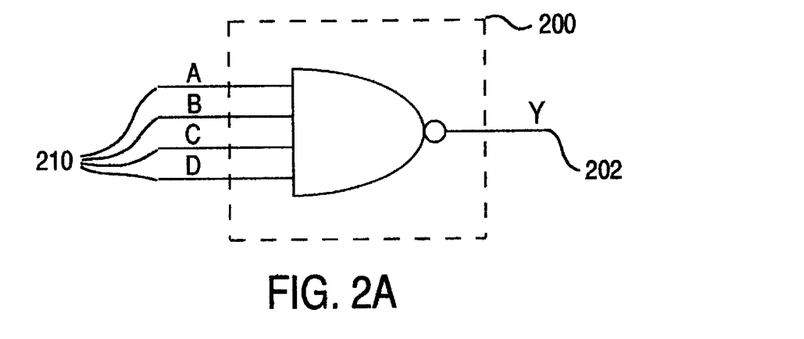
FIG. 2A illustrates an exemplary logic cell used by the present EDA system to model a 4-input NAND gate.

In order to understand how power-equivalent states are clustered, it is important to review how a state is defined in combinational circuits. Generally, a steady state of a combinational circuit is defined by its inputs and corresponding outputs. Since no memory elements (latches or flip-flops) are involved, each input pattern will generate only one output pattern. Thus, the number of possible steady states for a cell can be easily calculated by $2^N$, where N is the number of inputs. A exemplary logic cell 200 modeling a 4-input NAND gate is illustrated in FIG. 2A. Logic cell 200 includes four inputs 201 and an output 202. For simplicity, input pins 201 are labeled A, B, C, and D, respectively, and output pin 202 is labeled Y. Table 1 lists all 16 possible steady states for logic cell 200.

TABLE 1

| Steady States (ABCD_Y) |
|---|
| 0000_1 |
| 0001_1 |
| 0010_1 |
| 0011_1 |
| 0100_1 |
| 0101_1 |
| 0110_1 |
| 0111_1 |
| 1000_1 |
| 1001_1 |
| 1010_1 |
| 1011_1 |
| 1100_1 |
| 1101_1 |
| 1110_1 |
| 1111_0 |

Figure 2B:
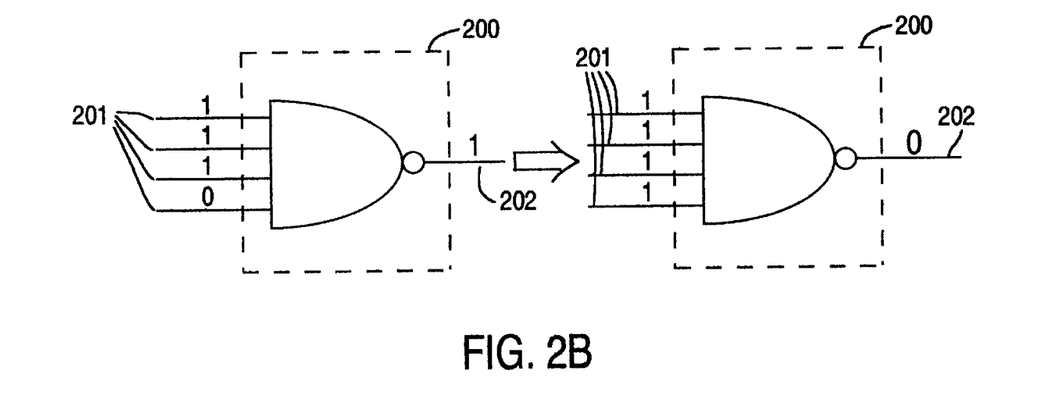
FIG. 2B illustrates an exemplary transition undergone by the exemplary logic cell of FIG. 2A.

As discussed above, power consumption of digital circuits is strongly dependent on switching activities. Particularly, power dissipation or consumption is state dependent. That is, depending on an "initial" state and a "final" state of a transition, different amount of power will be consumed. FIG. 2B illustrates an exemplary transition undergone by logic cell 200. As illustrated, before the transition, logic cell 200 receives an input pattern of 1110, and generates an output of 1. After the transition, however, logic cell 200 receives an input pattern of 1111 and generates an output of 0.

Figure 2C:
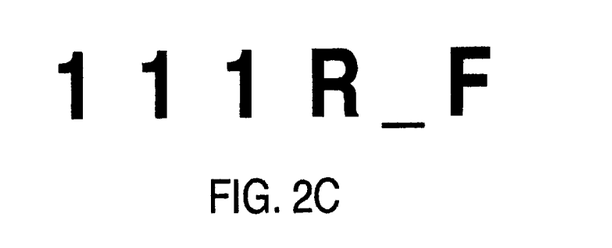
FIG. 2C illustrates an exemplary transition state symbolically representing the transition occurring in FIG. 2B.

In furtherance of the present embodiment, a symbolic representation of the transition states is adopted. Specifically, the "initial" state and the "final" state of the transition are symbolically represented by a transition state. FIG. 2C illustrates an exemplary transition state representing symbolically transition in FIG. 2B. As shown in FIG. 2C, logic cell 200 receives an input pattern of 111R, and generates an output F. "R" and "F" symbolically represents a rising signal (from 0 to 1) and a falling signal (from 1 to 0), respectively. A few more examples of the symbols representing the transition states are described in Table 2 to facilitate the understanding of the notation used herein.

TABLE 2

| Transition States (ABCD_Y) | Meaning |
|---|---|
| F000_1 | input-A changes from 1 to 0 (i.e. a falling transition) while the other inputs remain at 0 (or logic low). This input transition results in no output change (i.e. Y remains at 1 or logic high). |
| F111_R | input-A changes from 1 to 0 while the other inputs remain at 1. This input transition results in output-Y changes from 0 to 1 (i.e. rising transition). |
| R000_1 | input-A changes from 0 to 1 while the other inputs remain at 0. This input transition results in no output change (i.e. output-Y remains at 1). |
| R111_F | input-A changes from 0 to 1 while the other inputs remains at 1. This input transition results in output-Y changes from 1 to 0. |

Given a single input change at a time, the number of transition states for a cell can be computed by $2^N*N$. For the exemplary logic cell 200 illustrated in FIG. 2A, the number of possible transition states with only a single input change is 64. Table 3 illustrates all 64 transition states having single input changes.

TABLE 3

| Transition States | | | |
|---|---|---|---|
| F000_1 | 0F01_1 | 00F0_1 | 000F_1 |
| F001_1 | 0F01_1 | 00F1_1 | 000R_1 |
| F010_1 | 0F10_1 | 00R0_1 | 001F_1 |
| F011_1 | 0F11_1 | 00R1_1 | 001R_1 |
| F100_1 | 0R00_1 | 01F0_1 | 010F_1 |
| F101_1 | 0R01_1 | 01F1_1 | 010R_1 |
| F110_1 | 0R10_1 | 01R0_1 | 011F_1 |
| F111_R | 0R11_1 | 01R1_1 | 011R_1 |
| R000_1 | 1F00_1 | 10F0_1 | 100F_1 |
| R001_1 | 1F01_1 | 10F1_1 | 100R_1 |
| R010_1 | 1F10_1 | 10R0_1 | 101F_1 |
| R011_1 | 1F11_R | 10R1_1 | 101R_1 |
| R100_1 | 1R00_1 | 11F0_1 | 110F_1 |
| R101_1 | 1R01_1 | 11F1_R | 110R_1 |
| R110_1 | 1R10_1 | 11R0_1 | 111F_R |
| R111_F | 1R11_F | 11R1_F | 111R_F |

It is also important to note that, in Table 2, all 64 transition states involve only a single input change. It should be noted that, in the present embodiment of the invention, only single input transitions are characterized. For simplicity, power consumption characteristics of multiple-input transitions is left to be resolved by power estimation tools. However, it should be apparent to a person of ordinary skill in the art, upon reading the present disclosure, that the present invention may be applied to determine the power consumption characteristics of multiple-input transitions.

In the prior art cell characterization methods, all sixty-four transition states have to be characterized in order to completely capture the power behavior of logic cell 200. For small cells such as the present exemplary 4-input NAND gate cell 200, it is possible to carry out power analysis in an exhaustive manner rather quickly. However, it would take an implausible amount of time and computational power to exhaustively characterize more complicated cells with a larger number of inputs (e.g. larger than 10). In furtherance of one embodiment of the present invention, transition states that share similar power characteristics (power-equivalent states) are identified and grouped into clusters. Accordingly, instead of characterizing each individual transition state, only one transition state from a cluster needed to be characterized regardless of the cluster size.

Figure 3:
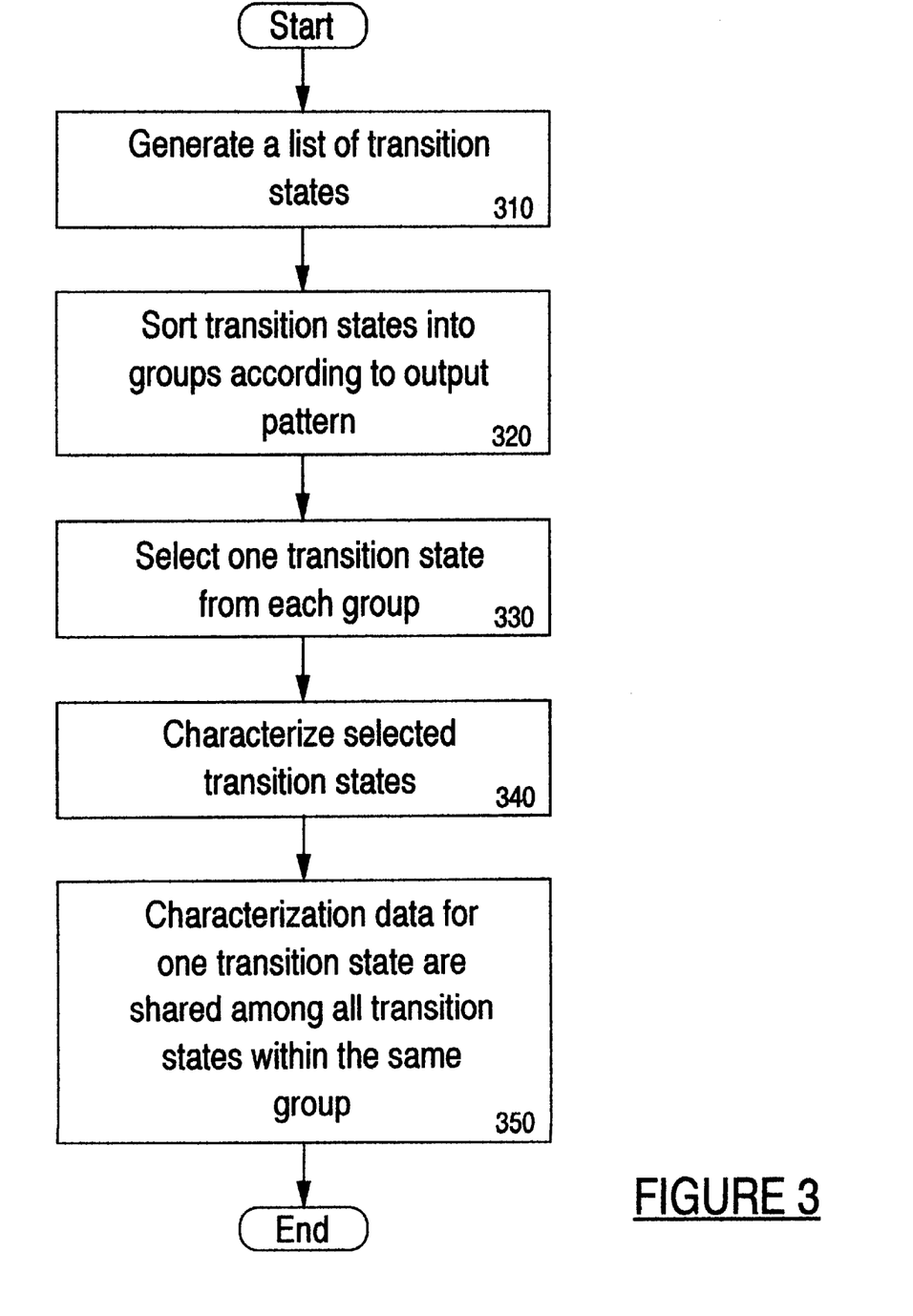
FIG. 3 is a flow diagram illustrating the steps of identifying and grouping power-equivalent states according to one embodiment of the present invention.

FIG. 3 is a flow diagram describing how transition states are identified and grouped according to one embodiment of the present invention. As illustrated, step 310 generates a list of transition states of a logic cell being characterized. For example, with reference to exemplary logic cell 200, a list including sixty-four transition states described in Table 3 is generated. Preferably, the list of transition states is generated based on the steady states data already included in the cell library. It would also be apparent to a person of ordinary skill in the field of logic modeling that, upon reading the present disclosure, other methods may also be used.

In step 320, the transition states in the list are sorted according to an output pattern. For example, with reference to exemplary logic cell 200, the transition states may be sorted into three groups: (a) group_1: xxxx_R; (b) group_2: xxxx_F; and (c) group_3: xxxx_1. Notice that, in the specific example described in FIG. 2 and Table 3, there is no transition state having an output pattern of 0.

In step 330, one transition state is selected from each group. According to the present embodiment, the transition state may be selected arbitrarily. For example, with reference to exemplary logic cell 200, three transition states R111_F, 1F11_R, and 100F_1, may be selected.

In step 340, the selected transition states are characterized. Preferably, circuit simulation using SPICE or PowerMill is performed for the selected states to determine the power characteristics of the logic cell when the selected transition states are applied.

In step 350, the characterization data for one transition state are stored in association with and shared among all the transition states within the same group. Thus, objectives of the present invention are achieved as fewer simulations have to be run to fully characterize a logic cell.

Figure 4:
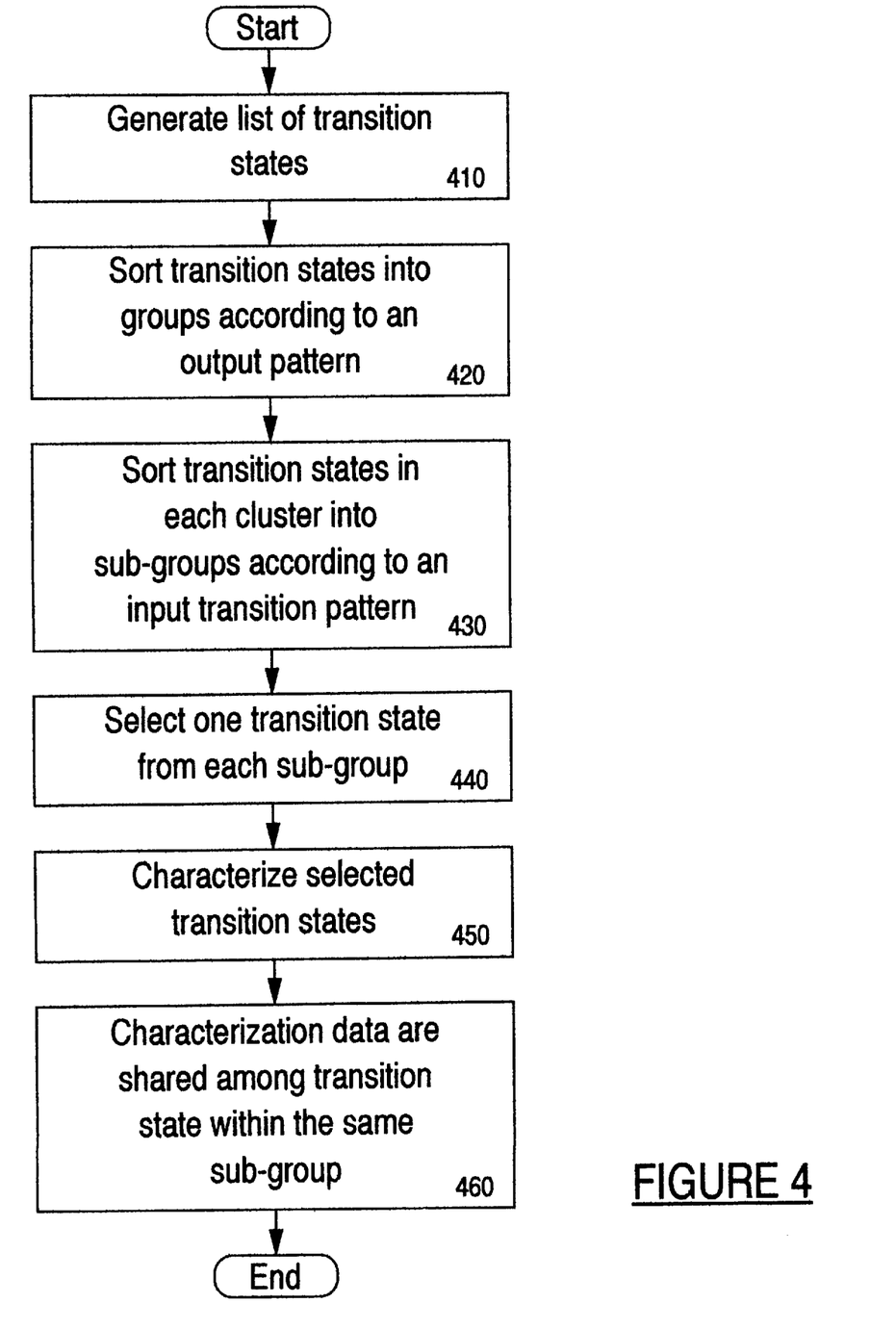
FIG. 4 is a flow diagram illustrating the steps of identifying and grouping power-equivalent states according to another embodiment of the present invention.

The method as illustrated in FIG. 3 may be imprecise for characterizing certain logic cells. FIG. 4 is a flow diagram illustrating a more precise method for providing characterization data for a logic cell and for minimizing simulation time according to another embodiment of the present invention. As illustrated in FIG. 4, step 410 generates a list of transition states of a logic cell being characterized. For example, with reference to exemplary logic cell 200, a list including sixty-four transition states described in Table 3 is generated. As discussed above with respect to the flow diagram of FIG. 3, the list of transition states is generated based on the cell function data already included in the cell library. Further, it would be apparent to those ordinarily skilled in the art, upon reading the present disclosure, that other methods of generating the list of transition states may be used.

In step 420, the transition states in the list are sorted according to an output pattern. This step is identical to step 320 of FIG. 3. For example, with reference to exemplary logic cell 200, the transition states may be sorted into three groups: (a) group_1: xxxx_R; (b) group_2: xxxx_F; and (c) group_3: xxxx_1.

In step 430, the transition states in each group are further clustered into sub-groups according to an input transition pattern. According to the present embodiment, the transition states within each group are separated into two sub-groups: one with a "rising" input transition, and another one with a "falling" input transition. For example, for logic cell 200 as illustrated in FIG. 2, the transition states may be subdivided into four sub-groups: (a) transition states with a rising output transition and a falling input transition, (b) transition states with a falling output transition and a rising input transition, (c) transition states with an output of 1 and a rising input transition, and (d) transition states with an output of 1 and a falling input transition. The four sub-groups of transition states are illustrated in Table 4.

Figure 5:
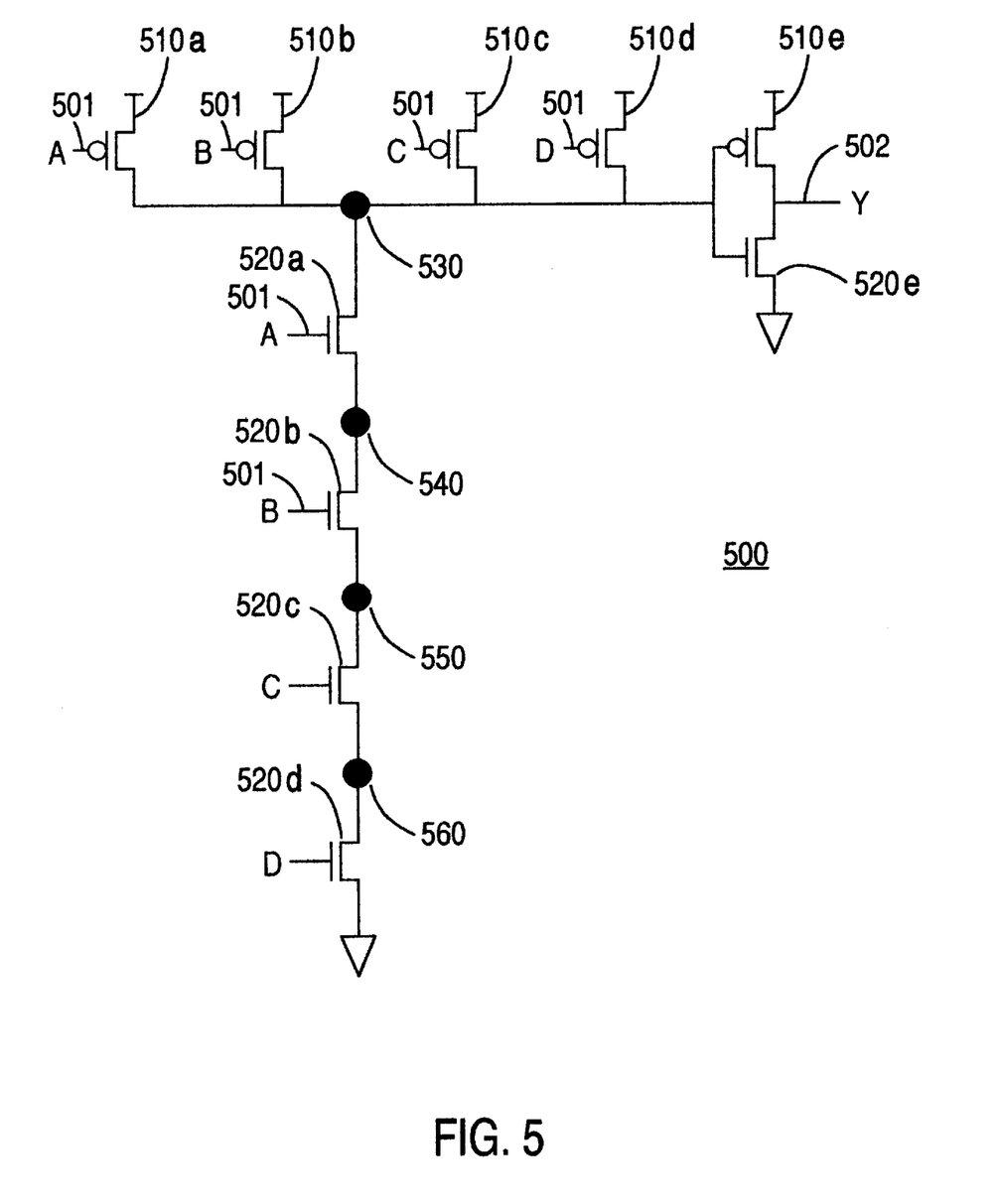
FIG. 5 illustrates an exemplary transistor level netlist representing a 4-input AND gate.

FIG. 5 illustrates a graphical representation of an exemplary netlist 500. Transistor-level netlists, which may be extracted from the cell libraries, are well known in the art and are typically used by simulation software such as SPICE to determine the characteristics of a cell. As illustrated, netlist 500 represents a network of transistors, which collectively forms a 4-input AND gate. Particularly, netlist 500 includes five PMOS transistors 510a–e, and five NMOS transistors 520a–e interconnected to PMOS transistors 510a–e via a plurality of nodes 530, 540, 550 and 560. Significantly, node 530 is coupled between PMOS transistors 510a–d and NMOS transistor 520a. Nodes 540, 550, and 560, on the other hand, is coupled to NMOS 510a–d only. Node 530 is referred to as a critical node, and nodes 540, 550, and 560 are referred to as regular nodes. The difference of critical nodes and regular nodes will be discussed in greater detail later.

In order to symbolically represent nodal activities, three steady states are defined for any circuit node: logic-high

TABLE 4

| Group_1: xxxx_R | | Group_2: xxxx_F | | Group_3: xxxx_1 | |
|---|---|---|---|---|---|
| Subgroup A with Rising input | Subgroup B with Falling input | Subgroup A with Rising input | Subgroup B with Falling input | Subgroup A with Rising input | Subgroup B with Falling input |
| none | F111_R | R111_F | none | Rxxx_1 | Fxxx_1 |
| | 1F11_R | 1R11_F | | xRxx_1 | xFxx_1 |
| | 111F_R | 111R_F | | xxRx_1 | xxFx_1 |
| | 11F1_R | 11R1_F | | xxxR_1 | xxxF_1 |

*x denotes "don't cares"

In step 440, one transition state is selected from each group. According to the present embodiment, the transition state may be selected arbitrarily. For example, with reference to exemplary logic cell 200, four representative transition states 1F11_R, R111_F, 1R00_1, and 100F_1, may be selected.

In step 450, the selected transition states are characterized. Preferably, circuit simulation using SPICE or Power-Mill is performed for the selected states to measure the power consumption characteristics of the logic cell when the selected transition states occur.

In step 460, the characterization data for one transition state are stored in association with and shared among all the transition states within the same group. Therefore, objectives of the present invention are achieved as fewer simulations have to be run to fully characterize a logic cell.

With respect to the embodiments as described in FIG. 3 and FIG. 4, grouping is based solely on comparison of the transition states of a logic cell. Since no RC circuits simulation and states sorting are involved in the grouping of the transition states, the present embodiments may be performed very quickly.

V. NODAL TRANSITION PATTERNS (NTP)

According to one embodiment of the present invention, more precise characterization data can be calculated if transition activities within a logic cell are taken into account. Particularly, by monitoring transition activities of circuit nodes, as well as transition activities in the inputs and outputs, transition states with very similar power behavior can be identified. In the present embodiment, Nodal Transition Patterns (NTPs) are used to symbolically represent the nodal activities of a logic cell such that grouping of power-equivalent states is facilitated.

(Hi), logic-low (Lo), and high impedance or floating (Hi-Z). As long as a circuit is stable, a circuit node must stay in one of the three states. However, if an input is changed, the circuit node may switch from one state to another depending on the status of connected transistors. A circuit node switching from one state to another may be symbolically represented. In accordance with one embodiment of the present invention, the transition symbols for describing nodal transition activities are described in Table 5.

TABLE 5

| Symbol | Meaning |
|---|---|
| F | falling, node switches from Hi to Lo |
| R | rising, node switches from Lo to Hi |
| H | high, node switches from Hi to Hi |
| L | low, node switches from Lo to Lo |
| z | floating, node switches from Hi-Z to Hi-Z |
| f | float to low, node switches from Hi-Z to Lo |
| r | float to high, node switches from Hi-Z to Hi |
| h | high to floating, node switches from Hi to Hi-Z |
| l | low to floating, node switches from Lo to Hi-Z |

Figure 6A:
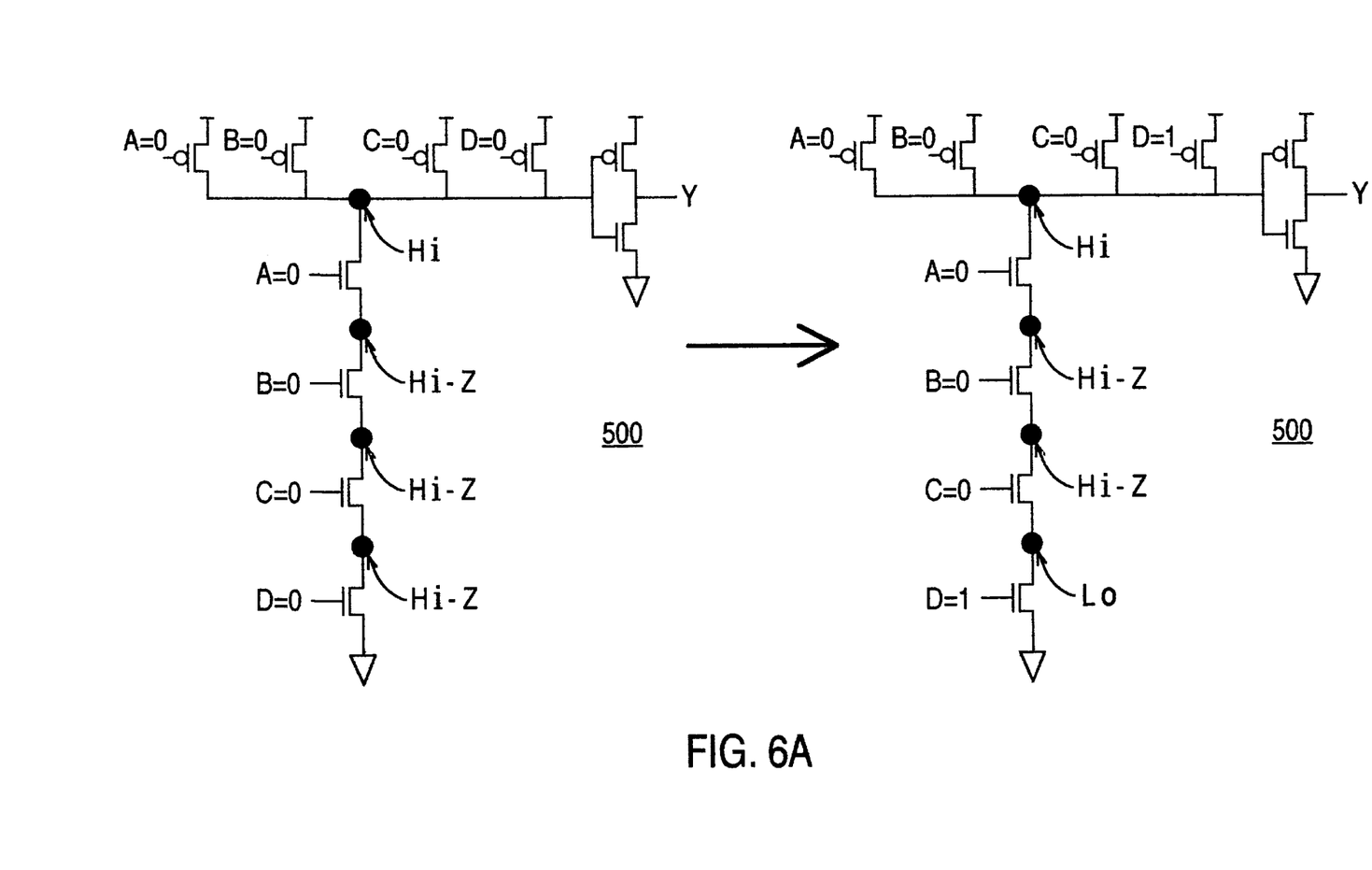
FIG. 6A illustrates an exemplary transition undergone by a 4-input AND gate.

FIG. 6A illustrates an exemplary transition undergone by a 4-input AND gate 600. As illustrated, before the transition, AND gate 600 receives an input pattern of 0000, and generates an output of 0. Before the transition, logic states at nodes 530, 540, 550, and 560 may be symbolically represented by Hi, Hi-Z, Hi-Z, and Hi-Z, respectively. After the transition, AND gate 600 receives an input pattern of 0001 and generates an output of 0. In response to the input change, logic states at node 530, 540, 550, and 560 become Hi, Hi-Z, Hi-Z, and Lo, respectively.

Figure 6B:
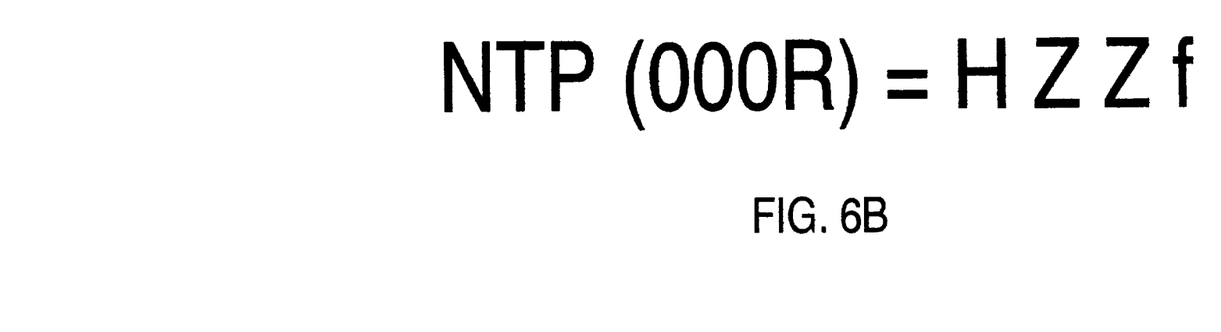
FIG. 6B illustrates an exemplary Nodal Transition Pattern symbolically representing the transition occurring in FIG. 6A.

The transition as illustrated in FIG. 6A can be represented symbolically by using the notation defined in Table 5. An example of such symbolic representation is illustrated in FIG. 6B. As shown, transitions at nodes 530, 540, 550, and 560 can be represented by the transition symbols H, Z, Z, f respectively. The first symbol, "H," corresponds to node 530 which remains at "Hi" after the transition. The second symbol and third symbol, "Z," correspond to nodes 540 and 550, respectively, and represent that logic states at nodes 540 and 550 remain at "Hi-Z." The fourth symbol, "f," denotes that the logic state at node 550 changes from "Hi-Z" to "Lo" after the transition. The string of symbols as illustrated in FIG. 6B is referred herein as a nodal transition pattern (NTP) for the input transition pattern 000R. Similarly, nodal transition activities for other input transition patterns, such as 111F, 1R01, may also be described by their respective NTPs.

In furtherance of the present invention, in one embodiment, the nodes are classified into several categories: critical nodes, regular nodes, and input/output nodes. In CMOS logic, for instance, critical nodes are defined to be nodes which is connected to the sources/drains of both NMOS and PMOS transistors. For example, with respect to exemplary AND gate 600, node 530 is a critical node. Regular nodes are defined to be nodes which is connected to the source/drains of one type of NMOS transistors or PMOS transistors only. In the exemplary AND gate 600, nodes 540, 550, and 560 may be considered as regular nodes. Input/output nodes are defined to be the nodes which are connected to an external signal source, such as inputs 501 or output 502.

Once the nodes are classified, different weights can be assigned to different types of nodes such as a nodal transition at a critical node can be distinguished from one occurring at a regular node. For the purpose of explanation only, a weight of 1000 (one thousand) will be applied to critical nodes, and a weight of 1 (one) will be applied to the regular nodes. Regular nodes are assigned a weight of 1 (one) because the effect on power consumption of a transitioning critical node is much more pronounced than that of a regular node. Thus, an NTP for transition state 000R for nodes 530 (n1), 540 (n2), 550 (n3), and 560 (n4) can be represented symbolically as follows:

NTP (000R): n1, n2, n3, n4=1000HZZf.

It should be noted that the weight may be arbitrarily assigned as long as the function of distinguishing a critical node over other nodes is met. Generally speaking, the first choice for the weight is the average node capacitance that can be calculated directly from the transistor netlist of a cell.

Beside incorporating a weight factor into the NTP, according to another embodiment of the present invention, precision of the characterized cells will be further improved if a strength factor is also incorporated. The strength factor is defined as a parameter representative of the number of charging or discharging paths for node before and after a transition. For example, the strength factor for node 510 of AND gate 600 for transition pattern 000R is 0.75. The value 0.75 is arrived at by comparing a number of paths connecting node 510 to either $V_{DD}$ or GND in the initial steady with one in the final steady state. Particularly, in the initial steady state 0000, the number of charging/discharging paths is 4, since PMOS transistors 510*a–d* are "on." Further, in the final steady state 0001, the number of charging/discharging paths is 3 because PMOS transistors 510*a–c* are "on," and PMOS transistors 510*d* is "off." This strength factor, representative of a ratio of the number of charging/discharging paths between the initial steady state and the final steady state, is thus 0.75. An example of an NTP incorporating the strength factor is:

NTP(000R): n1, n2, n3, n4=0.75HZZf.

If the weight factor for critical nodes is also taken into account, the NTP would become:

NTP(000R): n1, n2, n3, n4=750HZZf.

After all the NTPs of all input transitions are determined, power-equivalent states are then identified and grouped together. According to one embodiment of the present invention, power-equivalent states are identified and grouped by a Switching Dynamics Composer (SDC).

VI. NODAL SWITCHING DYNAMICS COMPOSER

In accordance with one embodiment of the present invention, after the NTPs for all the transition states are determined, the NTPs are further processed by a Switching Dynamics Composer (SDC) to generate composed nodal switching dynamics patterns (NSDPs). The NSDPs are then used for identifying power-equivalent states and for grouping the power-equivalent states into clusters.

The SDC serves the purposes of eliminating trivial nodal transition activities and transforming essential NTPs into a more manageable format. It is critical to realize that different transitions occurring at the same circuit node can contribute different levels of significance to the overall power consumption of the circuit. For example, a 0-to-1 rising transition (R-type) at a circuit node will consume more power than a Hi-Z-to-Lo transition (f-type) occurring at the same circuit node. Further, it is important to note that identical transition type at different types of circuit nodes may consume different amount of power. Finally, it is important to realize that not every transition type affects power characteristics of a cell. Particularly, in the present embodiment, nodal transition types R, F, H, r, f, h, and l are considered essential transition types for state dependent power characterization. Transition types L and z are not considered essential transition types because of their relatively negligible impact on power consumption, and are therefore ignored by the SDC. According to one embodiment of the present invention, the NSDP is composed according to the following procedure:

$$NSDP(R, F, H, r, f, h, l) = \sum_{i=1}^{N} \sum_{j=R}^{l} w_i f_i T_j$$

where N is the number of nodes, $w_i$ is the weight assigned to node i and $f_i$ is the strength factor contributed to the node transition. $T_j$ is the essential transition type. To further speed up the grouping process, nodal transition types H, h, and l can be ignored. However, the minimum set of nodal transition types (i.e. R, F, r, and f) must be retained to guarantee a good accuracy.

Figure 6C:
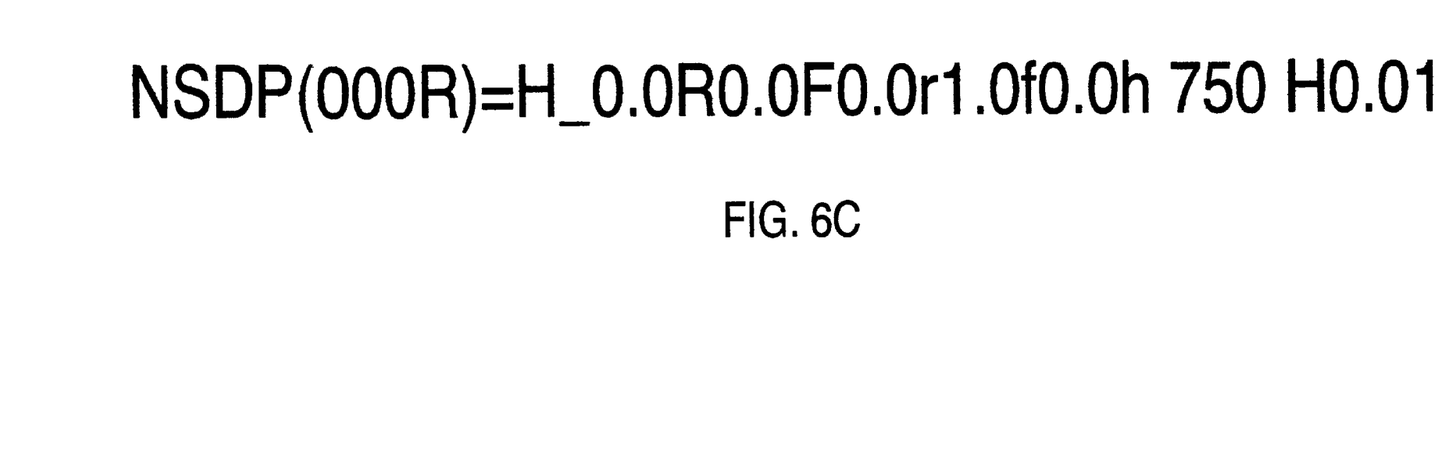
FIG. 6C illustrates an exemplary Nodal Switching Dynamics Pattern symbolically representing the transition occurring in FIG. 6A.

For example, the SDC can be applied to an NTP for exemplary AND gate 600 to generate a NSDP. The NSDP for the transition state 000R is given in the following as an example:

NSDP(000R)=H_0.0R0.0F0.0r1.0f0.0h750H0.0l

In the NSDP above, the first H represents the state of output node 570. As discussed earlier in Section II, the output transition pattern serves as the first criteria for grouping transition states. Thus, output transition patterns are represented separately from other node activities. The value '0.0R' denotes that none of the nodes switches from logic low to logic high under the input transition 000R. The value '1.0f' denotes that only one node changes from high impedance to logic low (f-type transition). Similarly, there are no F-type, r-type, h-type, or l-type transitions. The switching activity at node 510 induced by the input transition 000R is denoted by 750H. The value 750 is calculated based on the weight (e.g. one thousand) assigned to the node 530 and a derived strength factor of 0.75.

According to the present embodiment, the NSDP is used as the key to index a hash table. The transition state (e.g. 000R) corresponding to the NSDP becomes a value of the table entry referenced by the NSDP key. This hash table enables the transition states to be grouped automatically. In this way, transition states inducing identical NSDPs in a circuit will be appended to the hash table indexed by the same NSDP key. Hash tables are well known in the art of computer programming, and, accordingly, a person of ordinary skill in the art, upon reading the present disclosure, would be enabled to construct a hash table which is capable of performing the aforementioned functions.

By using the NSDPs as keys to a hash table according to the present invention, the process of grouping power-equivalent states is facilitated, and can be performed very quickly on high-performance computer systems. In addition, the present invention simplifies the task of managing a tremendous amount of data at the power analysis phase of the EDA process. Without the SDC, power analysis tools would probably have to search every group and compare the thousands of strings of NTP data in order to find the correct cluster that includes the transition state.

VII. FORMAL FLOW OF NTP GROUPING

Figure 7:
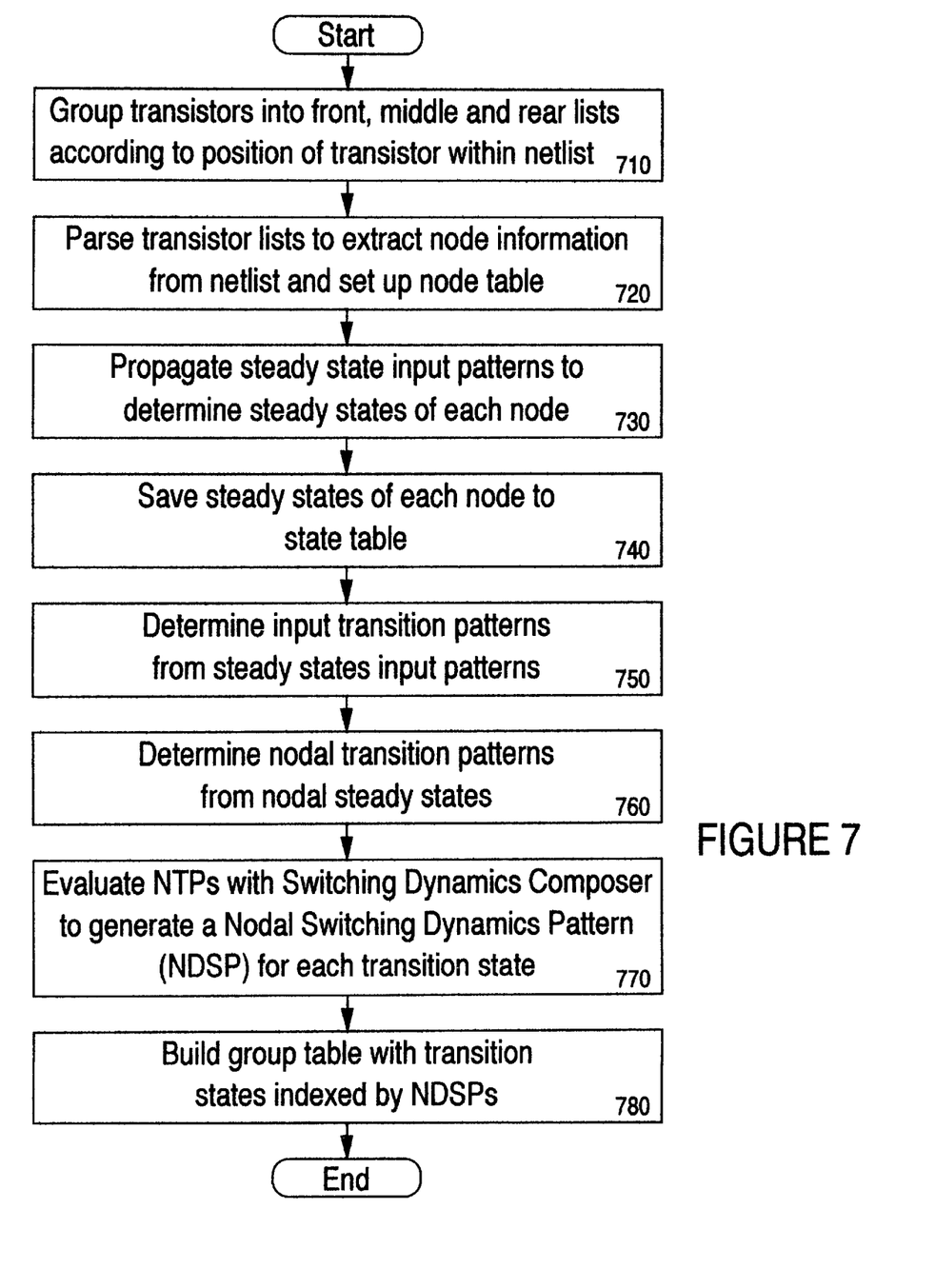
FIG. 7 is a flow diagram illustrating a method of reducing macrocell characterization time according to one embodiment of the present invention.

FIG. 7 is a flow diagram illustrating a method of reducing macrocell characterization time according to one embodiment of the present invention. In step 710, given a SPICE netlist of a logic cell, the transistors of the logic cell are divided into three lists: a front list, a middle list, and a rear list. Transistors with gate terminal connected to an external pin (e.g. primary input, VDD, or GND) and drain or source terminal connected to an external signal are included in the front list. A transistor is included in the middle list if its gate terminal is connected to an external signal but neither its source nor its drain terminal is connected to external inputs. If none of the gate, drain, or source terminals of a transistor is connected to an external signal, the transistor will be saved in rear list. The front, middle, and rear lists determine the evaluation order when propagating input signals.

In step 720, when parsing the netlist, data with respect to circuit nodes, such as the transistors the nodes are connected to, are saved to a node table. A node label is generated for each circuit node, and each node table entry is indexed by a node label. An initial value of high-impedance (Hi-Z) is assigned to all the node table entries.

In step 730, after the node table and the transistor lists are setup, steady state input patterns are applied and propagated throughout the switch-level network of the logic cell. After each steady state input pattern is propagated, the logic state at each node will be determined according the on/off status of transistors coupled to the node. Step 730 is repeated for all possible steady state input patterns. For example, in the 4-input AND gate example of FIG. 5, a total number of 16 steady state input patterns will be applied and propagated.

In step 740, the nodal steady state patterns obtained in step 730 are formatted and saved into a state table. The state table entries are indexed by the steady input state. In the specific embodiment discussed above characterizing the 4-input AND gate 600, 16 steady state input patterns are applied and a state table indexed by the input patterns containing corresponding nodal state patterns will be created. An exemplary state table for the 4-input gate 600 is illustrated in Table 7.

TABLE 7

| STEADY STATE INPUT PATTERN (ABCD) | Nodal Steady States (n1, n2, n3, n4) |
|---|---|
| 0000 | Hi, Hi-Z, Hi-Z, Hi-Z |
| 0001 | Hi, Hi-Z, Hi-Z, Lo |
| 0010 | Hi, Hi-Z, Hi-Z, Hi-Z |
| 0011 | Hi, Hi-Z, Lo, Lo |
| 0100 | Hi, Hi-Z, Hi-Z, Hi-Z |
| 0101 | Hi, Hi-Z, Hi-Z, Lo |
| 0110 | Hi, Hi-Z, Hi-Z, Hi-Z |
| 0111 | Hi, Lo, Lo, Lo |
| 1000 | Hi, Hi, Hi-Z, Hi-Z |
| 1001 | Hi, Hi, Hi-Z, Lo |
| 1010 | Hi, Hi, Hi-Z, Hi-Z |
| 1011 | Hi, Hi, Lo, Lo |
| 1100 | Hi, Hi, Hi, Hi-Z |
| 1101 | Hi, Hi, Hi, Lo |
| 1110 | Hi, Hi, Hi, Hi |
| 1111 | Lo, Lo, Lo, Lo |

In step 750, an input transition pattern is generated from two steady state input patterns: the "initial" steady state pattern, and the "final" steady state pattern. For simplicity, input transition patterns are only generated for steady state input patterns that differ by a single bit. For example, the input transition pattern 101R is generated from the initial steady state pattern 1010 and the final steady state pattern 1011.

In step 760, a nodal transition pattern (NTP) is generated from the nodal steady states. For example, nodal steady state Hi, Hi, Hi-Z, Hi-Z (corresponding to steady state input pattern 1010), and nodal steady state Hi, Hi, Lo, Lo, (corresponding to steady state input pattern 1011), are compared to generate the nodal transition pattern: NTP (101R):n1, n2, n3, n4=HHff.

In step 770, the NTP generated in step 760 is evaluated by SDC to produce an NSDP for the input transition pattern generated in step 750. In the specific example in step 760, an NSDP will be generated from HHff. The steps for generating a NSDP from an NTP are described above in Section VI.

In step 780, the NSDP generated in step 770 is stored in association with its corresponding input transition pattern in a hash table. In the hash table, the NSDP will serve as keys to index the input transition patterns. Steps 730 through 780 are then repeated for all possible input transition patterns for the logic cell. In this way, input transition patterns which produce identical NSDPs will be automatically grouped together. Table 8 illustrates an exemplary group table generated when the method according to the present embodiment is applied to a 4-input NAND gate.

TABLE 8

| Nodal Switching Dynamics Patterns (group table keys) | Transition Patterns (group table entry) | | |
|---|---|---|---|
| 1__322R0F0r5f | 001R | 01R1 | 101R |
| 1__322R0F347r0f | 1R00 | 1R01 | 1R10 |
| 1__322R0F0r7f | 011R | | |
| R__786R3F0r0f | 111F | 11F1 | |
| F__322R2F0r0f | R111 | | |
| F__322R4F0r0f | 1R11 | | |

TABLE 8-continued

| Nodal Switching Dynamics Patterns (group table keys) | Transition Patterns (group table entry) | | | | |
|---|---|---|---|---|---|
| 1__322R0F221r0f | R000 | R011 | R001 | R010 | |
| F__322R7F0r0f | 11R1 | | | | |
| F__322R7F0r2f | 111R | | | | |
| R__218R3F0r0f | F111 | | | | |
| 1__322R0F568r0f | R100 | R101 | R110 | | |
| R__439R3F0r0f | 1F11 | | | | |
| 1__322R0F0r0f | 0R00 | 0R01 | 11R0 | 01R0 | 0R10 |
| | 10R0 | 00R0 | | | |
| 1__322R0F0r2f | 000R | 0R11 | 110R | 010R | 100R |
| 1__0R3F0r0f | F000 | 0F11 | F011 | 01F1 | F101 |
| | 10F1 | 1F01 | 00F1 | 0F01 | F001 |
| | 011F | F110 | 101F | 1F10 | 001F |
| | 0F10 | F010 | 110F | 11F0 | 010F |
| | 01F0 | F100 | 100F | 10F0 | 1F00 |
| | 000F | 00F0 | 0F00 | | |
| 1__322R0F0r3f | 00R1 | 10R1 | | | |

As illustrated in Table 8, power-equivalent states are automatically grouped into clusters. For example, in the above example, 0F00 and 00F0 are power-equivalent states. As a result, one simulation run is required for characterizing the cluster. Further, in Table 8, for a 4-input NAND gate cell, a total number of 16 clusters are resulted. Thus, a total number of 16 simulation runs are required. As compared to a total number of 64 simulation runs as required in the prior art exhaustive characterization method, a significant saving of approximately 75% in simulation time is achieved. The accuracy tradeoff for such a tremendous saving in simulation time is less than 4%.

A method of minimizing characterization time for state dependent power analysis has thus been disclosed. By grouping transition states that yields identical symbolic nodal transitions, the total number of transition states to be characterized is reduced significantly. Consequently, tremendous amount of characterization time is saved. The present invention not only reduces characterization cost but also facilitates the processing of power estimation. First, the overall size of look-up tables is reduced due to the number of states needed to be characterized. Second, transition states are indexed directly by NTP patterns. Thus, there is no need to compare thousands of patterns in hundreds of groups in order to locate a correct power cluster for a transition state. Thus, the performance of cell-level power estimation tools is highly improved.

An additional advantage of the present invention is that, unlike convention characterization methods, it is not necessary to calculate or simulate the circuit to find out the overall switching capacitance of the circuit nodes. Rather, the actual power value consumed by each input transition is not required for grouping purposes. Further, since composing NSDPs is a static process which does not require exhaustive RC circuits simulation, the present invention can be accomplished much faster than conventional methods.

It should be noted that, while the present invention has been described in conjunction with the specific embodiments with respect to digital CMOS circuits, it will be understood they are not intended to limit the invention to these embodiments. On the contrary, it will be understood that the present invention is equally applicable to other families of integrated circuits, such as BiCMOS, which may be included within the spirit and scope of the invention as defined by the following claims.

What is claimed is:

1. In a computer controlled electronic design automation system, a computer implemented method of providing power consumption characterization data for a logic cell representation of a physical circuit, said method comprising the steps of:

(a) symbolically representing a plurality of transition states of said physical circuit based on a plurality of steady states of said logic cell representation;

(b) determining a plurality of nodal switching dynamics patterns of said logic cell, each nodal switching dynamics pattern corresponding to one of said plurality of transition states;

(c) comparing said nodal switching dynamics patterns;

(d) identifying a group of power-equivalent states from said plurality of transition states;

(e) selecting one transition state from said group of power-equivalent states; and (f) simulating said logic cell representation of said physical circuit to determine power characterization data of said logic cell when said selected transition state occurs; and (g) associating said power characterization data with said group of power-equivalent states.

2. The method according to claim 1 wherein said group of power-equivalent states comprise transition states having a same type of output transition pattern.

3. The method according to claim 1 wherein said group of power-equivalent states comprise transition states having a same type of input transition pattern.

4. The method according to claim 1 wherein said group of power-equivalent states comprise transition states having a same nodal switching dynamics pattern.

5. The method according to claim 1 wherein step (b) further comprises the steps of:

(h) analyzing a netlist of said logic cell representation to provide a list of circuit nodes of said physical circuit;

(i) determining a transition pattern for said circuit nodes for one of said transition states; and (j) transforming said transition pattern to a nodal switching dynamics pattern, wherein transition states having a similar nodal switching dynamics pattern are considered power-equivalent states.

6. The method according to claim 5 further comprising the steps of:

(k) applying a weight factor to a selected one of said circuit nodes, wherein said weight factor is representative of a position of said selected circuit node within said physical circuit.

7. The method according to claim 6 further comprising the steps of:

(l) applying a strength factor to a selected one of said circuit nodes, wherein said strength factor is representative of a number of paths connecting said selected circuit node to one of a charging source and a discharging source.

8. The method according to claim 5 wherein step (g) further comprises the steps of:

(m) providing a hash table for storing said transition states and said nodal switching dynamics patterns, wherein said transition states are indexed by said nodal switching dynamics patterns.

9. The method according to claim 5 wherein said nodal switching dynamics pattern is composed according to the following procedure:

$$NSDP(R, F, H, r, f, h, l) = \sum_{i=1}^{N} \sum_{j=R}^{l} w_i f_i T_j,$$

where N is a number of nodes, $w_i$ is a weight factor assigned to a node i, $f_1$ is a strength factor assigned to said node i, and $T_j$ denotes a transition type.

10. The method according to claim 5 wherein said nodal switching dynamics pattern is dependent upon transition types including one of R-type, F-type, r-type and f-type transitions.

11. In a computer controlled electronic design automation system, a computer implemented method for reducing characterization time for a logic cell representation of a physical circuit, said method comprising the steps of:

(a) analyzing a transistor-level netlist of said logic cell representation to provide a list of circuit nodes of said physical circuit;

(b) determining a plurality of transition states of said logic cell representation;

(c) determining nodal transition patterns for said circuit nodes according to said transitions states and said transistor-level netlist; and (d) transforming each nodal transition pattern to a nodal switching dynamics pattern, wherein transition states having a similar nodal switching dynamics pattern are considered power-equivalent states;

(e) selecting one of said power-equivalent states;

(f) simulating said logic cell representation of said physical circuit to determine power characterization data of said physical circuit when said selected power-equivalent state occurs; and (g) associating said power characterization data with said power-equivalent states.

12. The method according to claim 11 wherein step (d) further comprises the steps of:

applying a weight factor to a selected one of said circuit nodes, wherein said weight factor is representative of a position of said selected circuit node within said physical circuit.

13. The method according to claim 11 wherein step (d) further comprises the steps of:

applying a strength factor to a selected one of said circuit nodes, wherein said strength factor is representative of a number of paths connecting said selected circuit node to one of a charging source and a discharging source.

14. The method according to claim 11 wherein said nodal transition pattern is transformed to said nodal switching dynamics pattern by a switching dynamics composer.

15. The method according to claim 14 wherein said switching dynamics composer composes said nodal switching dynamics pattern according to the following procedure:

$$NSDP(R, F, H, r, f, h, l) = \sum_{i=1}^{N} \sum_{j=R}^{l} w_i f_i T_j,$$

where N is a number of nodes, $w_i$ is a weight factor assigned to a node i, $f_i$ is a strength factor assigned to node i, and $T_j$ denotes a transition type.

16. The method according to claim 14 wherein said switching dynamics pattern includes R-type, F-type, r-type, and f-type transitions.

17. The method according to claim 11 further comprising the step of:

providing a hash table for storing said transition states in association with said nodal switching dynamics patterns, wherein said transition states are indexed by said nodal switching dynamics patterns.

18. A computer readable memory having computer-readable program code embodied therein for providing power consumption characterization data for a logic cell representation of a physical circuit, said computer-reading program code for causing a computer to perform the steps of:

(a) analyzing a transistor-level netlist of said logic cell representation to provide a list of circuit nodes of said physical circuit;

(b) determining a plurality of transition states of said logic cell representation;

(c) determining nodal transition patterns for said circuit nodes according to said transitions states and said transistor-level netlist; and (d) transforming each nodal transition pattern to a nodal switching dynamics pattern, wherein transition states having a similar nodal switching dynamics are considered pattern power-equivalent states;

(e) selecting one of said power-equivalent states;

(f) simulating said logic cell representation of said physical circuit to determine power characterization data of said physical circuit when said selected power-equivalent transition occurs; and (g) associating said power characterization data with said power-equivalent transitions.

19. The computer readable memory as recited in claim 18 wherein said computer readable program code embodied therein further causes the computer to perform the step of:

applying a weight factor to a selected one of said circuit nodes, wherein said weight factor is representative of a position of said selected circuit node with respect to said physical circuit.

20. The computer readable memory as recited in claim 18 wherein said computer readable program code embodied therein further causes the computer to perform the step of:

applying a strength factor to a selected one of said circuit nodes, wherein said strength factor is representative of a number of paths connecting said selected circuit node to one of a charging source and a discharging source.

21. The computer readable memory as recited in claim 18 wherein said computer readable program code embodied therein further causes the computer to perform the step of:

composing said nodal switching dynamics pattern according to the following procedure:

$$NSDP(R, F, H, r, f, h, l) = \sum_{i=1}^{N} \sum_{j=R}^{l} w_i f_i T_j,$$

where N is a number of nodes, $w_i$ is a weight factor assigned to a node i, $f_i$ is a strength factor assigned to the node i, and $T_j$ denotes a transition type.

22. The computer readable memory as recited in claim 18 wherein said computer readable program code embodied therein further causes the computer to perform the step of:

providing a hash table for storing said transition states and said nodal switching dynamics patterns, wherein said transition states are indexed by said nodal switching dynamics patterns.

23. In a computer controlled electronic design automation system, a computer implemented method for reducing characterization time for a logic cell representation of a physical circuit, said method comprising the steps of:

- analyzing a transistor-level netlist of said logic cell representation to provide a list of circuit nodes of said physical circuit;
- determining a plurality of transition states of said logic cell representation;
- determining nodal transition patterns for said circuit nodes according to said transitions states and said transistor-level netlist, wherein transition states having a similar nodal transition pattern are considered power-equivalent states;
- selecting one of said power-equivalent states;
- simulating said logic cell representation of said physical circuit to determine power characterization data of said physical circuit when said selected power-equivalent state occurs; and
- associating said power characterization data with said power-equivalent states.

24. A computer readable memory having computer-readable program code embodied therein for providing power consumption characterization data for a logic cell representation of a physical circuit, said computer-reading program code for causing a computer to perform the steps of:

(a) analyzing a transistor-level netlist of said logic cell representation to provide a list of circuit nodes of said physical circuit;

(b) determining a plurality of transition states of said logic cell representation;

(c) determining nodal transition patterns for said circuit nodes according to said transitions states and said transistor-level netlist, wherein transition states having a similar nodal transition pattern are considered power-equivalent states;

(d) selecting one of said power-equivalent states;

(e) simulating said logic cell representation of said physical circuit to determine power characterization data of said physical circuit when said selected power-equivalent transition occurs; and (f) associating said power characterization data with said power-equivalent transitions.

25. In a computer controlled electronic design automation system, a computer implemented method for reducing characterization time for a logic cell representation of a physical circuit, said method comprising steps of:

- identifying a plurality of transitions of said logic cell representation;
- classifying said plurality of transitions into a first group and a second group, wherein transitions of said first group share a first transition pattern and wherein transitions of said second group share a second transition pattern;
- selecting a respective transition from said first group;
- determining power characterization data for said respective transition; and
- associating said power characterization data with said first group.

26. A method as recited in claim 25 further comprising step of classifying transitions of said first group into a first sub-group and a second sub-group, wherein transitions of said first sub-group share a third transition pattern and wherein transitions of said second sub-group share a fourth transition pattern.

27. A method as recited in claim 25 wherein transitions of said first group share a same output transition pattern and wherein transitions of said second group share a different output transition pattern.

28. A method as recited in claim 26 wherein transitions of said first sub-group share a same input transition pattern and wherein transitions of said second sub-group share a different input transition pattern.

* * * * *